(12) United States Patent
Kim et al.

(10) Patent No.: US 9,341,896 B2
(45) Date of Patent: *May 17, 2016

(54) LIQUID CRYSTAL DISPLAY

(75) Inventors: Dong-Gyu Kim, Yongin-si (KR); Kyoung-Ju Shin, Hwaseong-si (KR); Jong-Ho Son, Seoul (KR); Jun-Pyo Lee, Asan-si (KR); Seung-Soo Baek, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 540 days.

This patent is subject to a terminal disclaimer.

(21) Appl. No.: 13/599,414

(22) Filed: Aug. 30, 2012

(65) Prior Publication Data

US 2012/0320294 A1    Dec. 20, 2012

Related U.S. Application Data

(63) Continuation-in-part of application No. 12/356,370, filed on Jan. 20, 2009, now Pat. No. 8,610,867.

(30) Foreign Application Priority Data

Jan. 21, 2008    (KR) .................. 10-2008-0006346

(51) Int. Cl.
  *G02F 1/1343* (2006.01)
  *G02F 1/1337* (2006.01)
  *C09K 19/02* (2006.01)
  *C09K 19/04* (2006.01)
  (Continued)

(52) U.S. Cl.
  CPC .......... *G02F 1/133707* (2013.01); *C09K 19/02* (2013.01); *C09K 2019/0444* (2013.01); *G02F 1/137* (2013.01); *G02F 1/13624* (2013.01); *G02F 1/136209* (2013.01); *G02F 1/136213* (2013.01); *G02F 1/136286* (2013.01); *G02F 2201/40* (2013.01); *G09G 3/3607* (2013.01); *G09G 3/3659* (2013.01); *G09G 2300/0426* (2013.01)

(58) Field of Classification Search
None
See application file for complete search history.

(56) References Cited

U.S. PATENT DOCUMENTS 6,992,742 B2    1/2006    Kim et al.
7,499,129 B2    3/2009    Um et al.
(Continued)

FOREIGN PATENT DOCUMENTS

CN    2182006    11/1994
CN    1282039    1/2001
(Continued)

OTHER PUBLICATIONS

Non-Final Office Action issued on Dec. 17, 2012 in U.S. Appl. No. 12/356,370.

(Continued)

*Primary Examiner* — Richard Kim
(74) *Attorney, Agent, or Firm* — H.C. Park & Associates, PLC

(57) ABSTRACT

A liquid crystal display (LCD) including a liquid crystal panel, and a gate driver which applies a gate signal having a driving frequency equal to or greater than 100 Hz to the liquid crystal panel. The liquid crystal panel comprises a first display panel, a second display panel facing the first display panel, and a liquid crystal composition disposed between the first display panel and the second display panel and includes liquid crystals.

9 Claims, 12 Drawing Sheets

(51) Int. Cl.
   *G02F 1/1362* (2006.01)
   *G02F 1/137* (2006.01)
   *G09G 3/36* (2006.01)

(56) References Cited

U.S. PATENT DOCUMENTS

| | | | |
|---|---|---|---|
| 7,768,582 B2 | 8/2010 | Huh et al. | |
| 2001/0045545 A1 | 11/2001 | Tarumi et al. | |
| 2003/0136944 A1 | 7/2003 | Takehara et al. | |
| 2006/0103800 A1 | 5/2006 | Li et al. | |
| 2006/0221277 A1 | 10/2006 | Yang et al. | |
| 2007/0146283 A1* | 6/2007 | Hong | 345/98 |
| 2008/0143912 A1* | 6/2008 | Kim | 349/48 |
| 2011/0102695 A1 | 5/2011 | Katayama et al. | |

FOREIGN PATENT DOCUMENTS

| | | |
|---|---|---|
| CN | 1637513 | 7/2005 |
| CN | 1723260 | 1/2006 |
| CN | 101096140 | 1/2008 |
| EP | 1 054 321 | 11/2000 |
| EP | 1 872 948 | 1/2008 |
| JP | 2005-338818 | 12/2005 |
| JP | 2006-048055 | 2/2006 |
| KR | 10-2003-0025685 | 3/2003 |
| KR | 1020060083633 | 7/2006 |
| KR | 10-2007-0006981 | 1/2007 |

OTHER PUBLICATIONS

Chinese Office Action dated Sep. 27, 2011 issued for Chinese Patent Application No. 200910005055.0.
Chinese Office Action dated Jun. 18, 2012 issued for Chinese Patent Application No. 200910005055.0.
Non-Final Office Action dated Dec. 5, 2011 issued for co-pending U.S. Appl. No. 12/356,370.
Final Office Action dated May 3, 2012 issued for co-pending U.S. Appl. No. 12/356,370.
Final Office Action issued on May 21, 2013 in U.S. Appl. No. 12/356,370.
Corrected Notice of Allowance and Fee(s) Due dated Sep. 6, 2013 in U.S. Appl. No. 12/356,370.

* cited by examiner

LIQUID CRYSTAL DISPLAY

CROSS REFERENCE TO RELATED APPLICATIONS

This application is a continuation-in-part application of U.S. application Ser. No. 12/356,370, filed Jan. 20, 2009, and claims priority from and the benefit of Korean Patent Application No. 10-2008-0006346, filed on Jan. 21, 2008 all of which are incorporated herein by reference in their entirety.

BACKGROUND OF THE INVENTION

1. Field

Exemplary embodiments of the present invention relate to a liquid crystal display (LCD) that may provide an increased aperture ratio by negating the need for storage wiring.

2. Discussion of the Background

As modern society becomes more dependent on sophisticated information and communication technology, the need for larger and thinner displays is growing. In particular, since conventional cathode ray tubes (CRTs) have failed to fully satisfy this need, the demand for flat panel displays (FPDs), such as plasma display panels (PDPs), plasma address liquid crystal display panels (PALCs), liquid crystal displays (LCDs), and organic light emitting diodes (OLEDs), is dramatically increasing.

LCDs are one of the most widely used FPDs. An LCD includes two substrates on which electrodes are disposed, and a liquid crystal layer disposed between the two substrates. The alignment of liquid crystals of the liquid crystal layer is altered when voltages are applied to the electrodes, thereby adjusting the light transmissivity of the LCD. In this way, the LCD displays a desired image.

In order for an LCD to effectively display an image, a signal transmitted to a pixel electrode to alter the alignment of the liquid crystal must be maintained for a certain period of time. Generally, a signal transmitted to the pixel electrode to alter the alignment of the liquid crystals leaks within a short period of time. Thus, storage capacitors are connected in parallel to the pixel electrode so that electric charges applied to the liquid crystals may be maintained for the necessary period of time.

However, since a storage capacitor in an LCD overlaps a portion of each pixel electrode, the pixel aperture ratio of the LCD may be reduced.

SUMMARY OF THE INVENTION

The present invention provide a liquid crystal display (LCD) that may increase an aperture ratio by negating the need for storage wiring and improve display quality.

Additional features of the invention will be set forth in the description which follows, and in part will be apparent from the description, or may be learned by practice of the invention. The present invention discloses an LCD comprising: a liquid crystal panel, and a gate driver which applies a gate signal having a driving frequency equal to or greater than 100 Hz to the liquid crystal panel, wherein the liquid crystal panel comprises: a first display panel, a second display panel facing the first display panel, and a liquid crystal composition disposed between the first display panel and the second display panel and includes liquid crystals. If a dielectric constant in a direction parallel to a long axis of the liquid crystals is defined as a horizontal dielectric constant $\in_{\parallel}$, a dielectric constant in a direction perpendicular to the long axis of the liquid crystals is defined as a vertical dielectric constant $\in_{\perp}$, and the difference between the vertical dielectric constant $\in_{\perp}$ and the horizontal dielectric constant $\in_{\parallel}$ is defined as a dielectric anisotropy $\Delta\in$, then a ratio $\Delta\in/\in_{\perp}$ of the dielectric anisotropy $\Delta\in$ to the vertical dielectric constant $\in_{\perp}$ of the liquid crystal composition is 0.5 or less.

The present invention also discloses an LCD comprising a liquid crystal panel, and a gate driver which applies a gate signal having a driving frequency equal to or greater than 100 Hz to the liquid crystal panel, wherein the liquid crystal panel comprises a first display panel, a pixel electrode disposed on the first display panel, a second display panel facing the first display panel, a common electrode disposed on the second display panel and overlaps the pixel electrode, a decoupling electrode that partially overlaps the pixel electrode, and a liquid crystal composition disposed between the first display panel and the second display panel and includes liquid crystals. If a dielectric constant in a direction parallel to a long axis of the liquid crystals is defined as a horizontal dielectric constant $\in_{\parallel}$, a dielectric constant in a direction perpendicular to the long axis of the liquid crystals is defined as a vertical dielectric constant $\in_{\perp}$, and the difference between the vertical dielectric constant $\in_{\perp}$ and the horizontal dielectric constant $\in_{\parallel}$ is defined as dielectric anisotropy $\Delta\in$, then a ratio $\Delta\in/\in_{\perp}$ of the dielectric anisotropy $\Delta\in$ to the vertical dielectric constant $\in_{\perp}$ of the liquid crystal composition is 0.5 or less, and capacitance between the pixel electrode and the decoupling electrode is 5 to 20% of capacitance between the common electrode and the pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
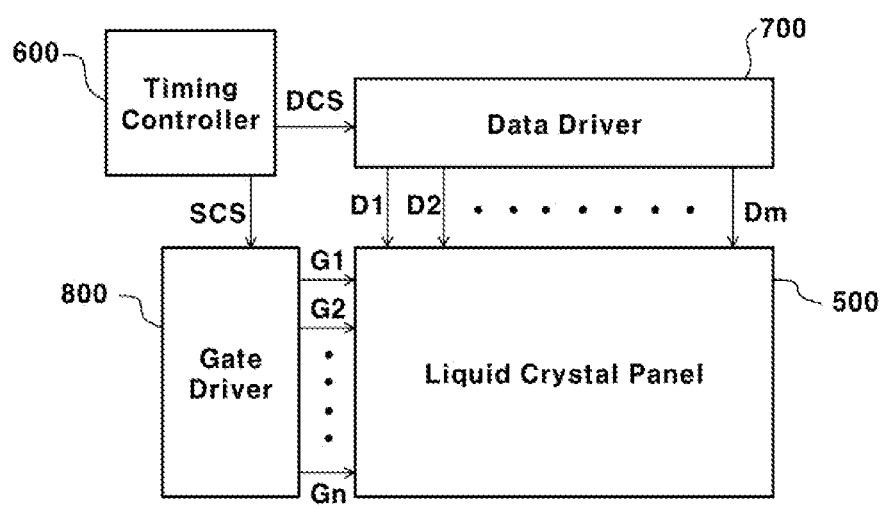
FIG. 1 is a block diagram of a liquid crystal display (LCD) according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Spatially relative terms, such as "below," "beneath", "lower", "above", "upper", and the like, may be used herein for ease of description to describe one element or feature's relationship to another element(s) or feature(s) as shown in the figures. Hereinafter, a liquid crystal display according to an exemplary embodiment of the present invention will be described in detail with reference to FIG. 1. FIG. 1 is a block diagram of a liquid crystal display (LCD) according to an exemplary embodiment of the present invention.

The LCD includes a liquid crystal panel 500, a timing controller 600, a data driver 700 and a gate driver 800.

The timing controller 600 may control the data driver 700 and the gate driver 800 to display a desired image on the liquid crystal panel 500. The timing controller 600 may generate a data control signal (DCS) for controlling the data driver 700 and transmit the data control signal (DCS) to the data driver 700. Further, the timing controller 600 may generate a gate control signal (GCS) for controlling the gate driver 800 and transmit the gate control signal (GCS) to the gate driver 800. The timing controller 600 may generate the data control signal (DCS) and the gate control signal (GCS) to correspond to a driving frequency of the LCD.

The driving frequency of the LCD may be the number of frames being displayed per second on the liquid crystal panel. In other words, the driving frequency of the LCD may be the number of times a data voltage is applied to each pixel electrode per second in the LCD. Herein, the driving frequency of a high frequency may mean the driving frequency equal to or greater than 100 Hz.

The timing controller 600 may generate the data control signal (DCS) and the gate control signal (GCS) to correspond to the driving frequency of a high frequency. In some exemplary embodiments, the timing controller 600 may generate the data control signal (DCS) and the gate control signal (GCS) corresponding to the driving frequency equal to or greater than 100 Hz. In some other exemplary embodiments, the timing controller 600 may generate the data control signal (DCS) and the gate control signal (GCS) corresponding to the driving frequency of 120 Hz, 180 Hz, 240 Hz or the like, which is a multiple of 60 Hz.

The data driver 700 may receive the data control signal (DCS) from the timing controller 600, generate data signals D1, D2, ..., Dm, and apply the data signals D1, D2, ..., Dm to the liquid crystal panel 500. The data signals D1, D2, ..., Dm may include information regarding colors and grayscales to be displayed by pixels included in the liquid crystal panel 500. The data driver 700 may generate the data signals D1, D2, ..., Dm to correspond to the driving frequency of a high frequency. In some exemplary embodiments, the data driver 700 may generate the data signals D1, D2, ..., Dm corresponding to the driving frequency equal to or greater than 100 Hz. In some other exemplary embodiments, the data driver 700 may generate the data signals D1, D2, ..., Dm corresponding to the driving frequency of 120 Hz, 180 Hz, 240 Hz or the like, which are all multiples of 60 Hz.

The gate driver 800 may receive the gate control signal (GCS) and generate gate signals G1, G2, ..., Gn corresponding to the gate control signal (GCS). The gate signals G1, G2, ..., Gn may control whether the respective pixels included in the liquid crystal panel 500 receive the data signals D1, D2, ..., Dm. The gate driver 800 may generate the gate signals G1, G2, ..., Gn to correspond to the driving frequency of a high frequency. In some exemplary embodiments, the gate driver 800 may generate the gate signals G1, G2, ..., Gn corresponding to the driving frequency equal to or greater than 100 Hz. In some other exemplary embodiments, the gate driver 800 may generate the gate signals G1, G2, ..., Gn corresponding to the driving frequency of 120 Hz, 180 Hz, 240 Hz or the like, which are all multiples of 60 Hz. According to some exemplary embodiments, the frequency of the gate signals may be equal to the driving frequency.

If the driving frequency is a high frequency, because the interval at which the data voltage is applied to the pixel electrode is small, although there is no storage capacitor or the value of the storage capacitor is very small, a reduction in the magnitude of the data voltage applied to the pixel electrode is small, thereby maintaining display quality. Accordingly, if the driving frequency is a high frequency, when a storage wiring is formed to be small or omitted, it is possible to maintain display quality while increasing an aperture ratio.

Figure 2:
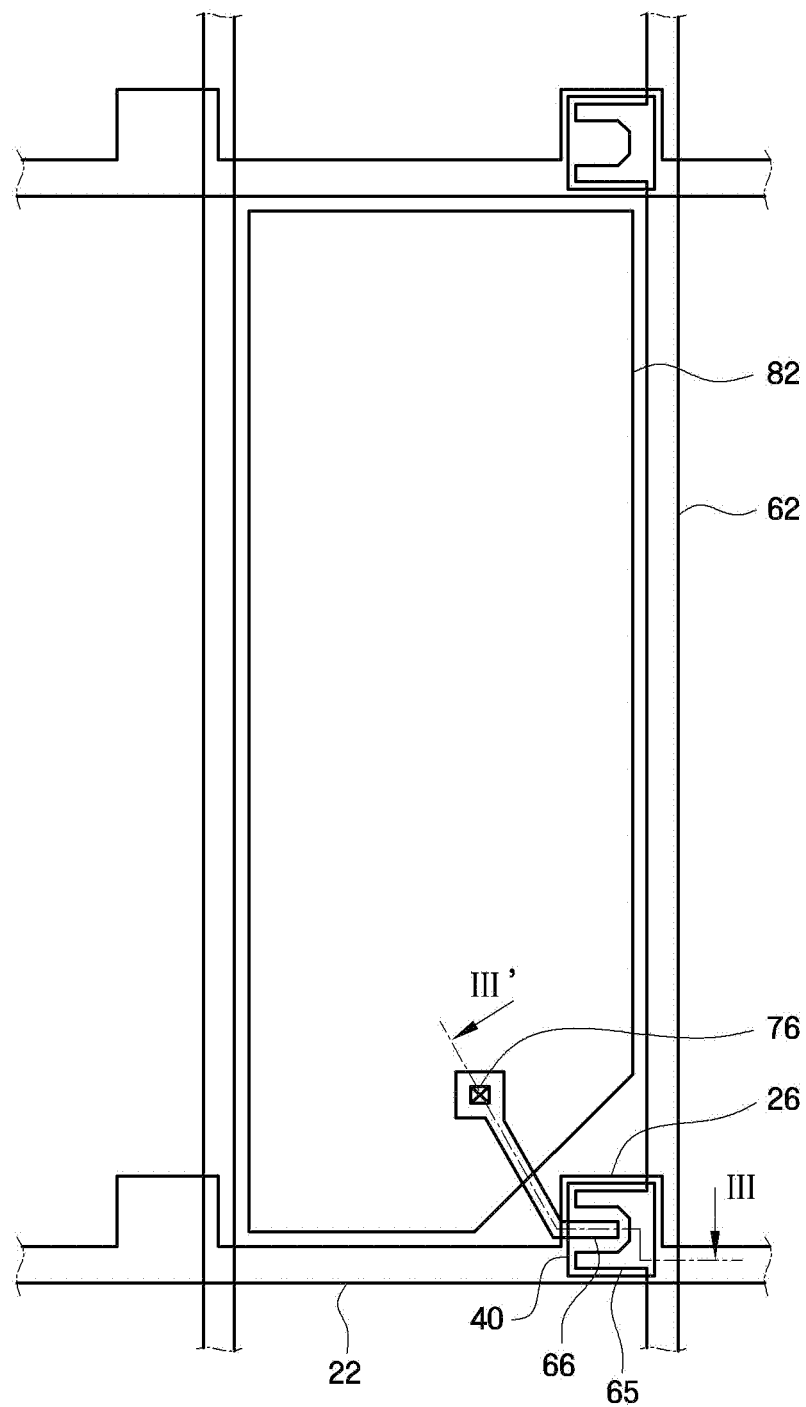
FIG. 2 is at plan view of a liquid crystal panel according to the exemplary embodiment of the present invention.
Figure 3:
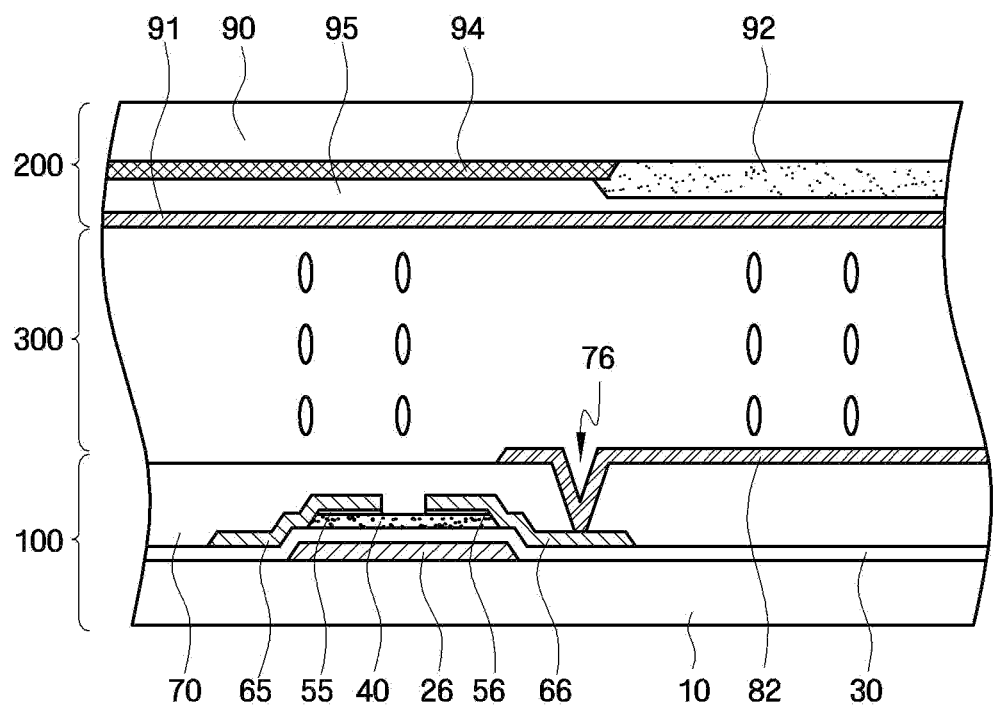
FIG. 3 is a cross-sectional view of the liquid crystal panel taken along line III-III' of FIG. 2.

Hereinafter, a liquid crystal panel according to an exemplary embodiment of the present invention will be described in detail with reference to FIGS. 2 and 3. FIG. 2 is a plan view of the liquid crystal panel according to an exemplary embodiment of the present invention. FIG. 3 is a cross-sectional view of the liquid crystal panel taken along a line III-III' of FIG. 2.

Referring to a lower display panel 100 of the LCD shown in FIG. 2 and FIG. 3, a gate line 22 is disposed on a first insulating substrate 10, which may be made of transparent glass. The gate line 22 generally extends in a horizontal direction and delivers a gate signal Ga (a is an integer equal to or greater than 1 and equal to or smaller than n, 1≤a≤n). In addition, the gate line 22 is allocated to each pixel. The gate line 22 has a protruding gate electrode 26. The gate line 22 and the gate electrode 26 are collectively referred to as gate wiring.

The gate wiring may be made of aluminum (Al)-based metal such as Al or Al alloys, silver (Ag)-based metal such as Ag or Ag alloys, copper (Cu)-based metal such as Cu or Cu alloys, molybdenum (Mo)-based metal such as Mo or Mo alloys, chrome (Cr), titanium (Ti), or tantalum (Ta).

In addition, the gate wiring may have a multi-layer structure composed of two conductive layers (not shown) having different physical characteristics. In this case, one of the two conductive layers may be made of metal with low resistivity, such as Al-based metal, Ag-based metal or Cu-based metal, in order to reduce a signal delay or a voltage drop of the gate wiring. Alternatively, the other one of the conductive layers may be made of a different material, in particular, a material having superior contact characteristics with indium tin oxide (ITO) and indium zinc oxide (IZO), such as Mo-based metal, Cr, Ti, or Ta. Examples of the multi-layer structure include a combination of a Cr lower layer and an Al upper layer and a combination of an Al lower layer and a Mo upper layer. However, the present invention is not limited thereto. The gate wiring may be made of various metals and conductors.

A gate insulating film 30, which may be made of silicon nitride (SiNx), is disposed on the gate line 22 and gate electrode 26.

A semiconductor layer 40, which may be made of hydrogenated amorphous silicon or polycrystalline silicon, is disposed on the gate insulating film 30. The semiconductor layer 40 may have various shapes. For example, the semiconductor layer 40 may be shaped like an island or may be linear. In the present exemplary embodiment, the semiconductor layer 40 is shaped like an island.

Ohmic contact layers 55 and 56 may be made of a material, such as silicide or n+ hydrogenated amorphous silicon which is doped with n-type impurities in high concentration, and are disposed on the semiconductor layer 40. The ohmic contact layers 55 and 56 are arranged in pairs on the semiconductor layer 40.

A data line 62 and a drain electrode 66, which corresponds to the data line 62, are disposed on the ohmic contact layers 55 and 56 and the gate insulating film 30.

The data line 62 generally extends in a vertical direction to cross the gate line 22 and delivers a data signal Db (b is an integer equal to or greater than 1 and equal to or smaller than m, $1 \le b \le m$). A source electrode 65 extends from the data line 62 toward the drain electrode 66. The data line 62 delivers the data signal Db to a pixel electrode 82. The data line 62, the source electrode 65, and the drain electrode 66 are collectively referred to as the data wiring.

The data wiring may be made of Cr, Mo-based metal, or refractory metal such as Ta and Ti. In addition, the data wiring may have a multi-layer structure composed of a lower layer (not shown), which is made of refractory metal, and an upper layer (not shown) which is made of a material with low resistivity and disposed on the lower layer. As described above, examples of the multi-layer structure may include a combination of a Cr lower layer and an Al upper layer and a combination of an Al lower layer and a Mo upper layer. Alternatively, the multi-layer structure may be a triple-layer structure having Mo—Al—Mo layers.

The source electrode 65 at least partially overlaps the semiconductor layer 40. In addition, the drain electrode 66 faces the source electrode 65 on the gate electrode 26 and at least partially overlaps the semiconductor layer 40. The ohmic contact layers 55 and 56 described above are interposed between the semiconductor layer 40, which is disposed under the ohmic contact layers 55 and 56, and the source electrode 65 and the drain electrode 66 which are disposed on the ohmic contact layers 55 and 56, respectively. Thus, the ohmic contact layers 55 and 56 may reduce contact resistance between the semiconductor layer 40 and the source and drain electrodes 65 and 66, respectively.

A passivation layer 70 is disposed on the data wiring and an exposed portion of the semiconductor layer 40. The passivation layer 70 may be made of an inorganic material such as silicon nitride ($SiN_x$) or silicon oxide ($SiO_x$), an organic material having photosensitivity and superior planarization characteristics, or a low-k dielectric material formed by plasma enhanced chemical vapor deposition (PECVD), such as a-Si:C:O or a-Si:O:F. The passivation layer 70 may be composed of a lower inorganic layer and an upper organic layer in order to protect the exposed portion of the semiconductor layer 40 while taking advantage of the superior characteristics of an organic layer. Furthermore, a red (R), green (G) or blue (B) color filter may be used as the passivation layer 70.

A contact hole 76 is formed in the passivation layer 70. The pixel electrode 82 is connected to the drain electrode 66 through the contact hole 76. Therefore, the pixel electrode 82 receives a data voltage and a control voltage from the drain electrode 66.

The pixel electrode 82, to which the data voltage is applied, generates an electric field together with a common electrode 91 of an upper display panel 200, thereby determining the alignment of liquid crystal between the pixel electrode 82 and the common electrode 91.

An alignment film (not shown), which can align a liquid crystal layer 300, may be coated on the pixel electrode 82 and the passivation layer 70.

Referring to the upper display panel 200 of the LCD shown in FIG. 3, a black matrix 94 to prevent the leakage of light and define a pixel region is disposed on a second insulating substrate 90 which may be made of transparent glass. The black matrix 94 may be disposed on portions of the second insulating substrate 90, which correspond to the gate line 22 and the data line 62, and a portion of the second insulating substrate 90 which corresponds to a thin-film transistor (TFT). In addition, the black matrix 94 may have various shapes in order to prevent the leakage of light in the vicinity of the pixel electrode 82 and the TFT. The black matrix 94 may be made of metal (metal oxide), such as chrome or chrome oxide, or organic black resist.

In addition, R, G and B color filters 92 may be sequentially arranged in the pixel region between the black matrices 94. An overcoat layer 95 may be formed on the R, G and B color filters 92 to planarize their step heights.

The common electrode 91 may be made of a transparent conductive material, such as ITO or IZO, and disposed on the overcoat layer 95. The common electrode 91 faces the pixel electrode 82, and the liquid crystal layer 300 is disposed between the common electrode 91 and the pixel electrode 82.

An alignment film (not shown) to align the liquid crystal may be coated on the common electrode 91.

Although not shown, the liquid crystal panel may further include a storage wiring for forming a storage capacitor. The storage wiring forms the storage capacitor to reduce a decreasing rate of the magnitude of the data voltage applied to the pixel electrode 82, thereby improving display quality. As described above, if the driving frequency of the LCD is a high frequency, the interval at which the data voltage is applied to the pixel electrode 82 becomes small. Accordingly, although the storage wiring is omitted, a reduction in the magnitude of the data voltage applied to the pixel electrode 82 is small, and the display quality is not reduced compared to a case of including the storage wiring. Omission of the storage wiring makes it possible to improve an aperture ratio of the LCD. If the lower and upper display panels 100 and 200 structured as described above are arranged and then coupled to each other and a liquid crystal material is injected between the lower and upper display panels 100 and 200 to form the liquid crystal layer 300, a basic structure of the liquid crystal panel according to the present exemplary embodiment is completed.

When a liquid crystal molecule is an optically uniaxial crystal, it exhibits anisotropy Δn of a refractive index. That is, a uniaxial crystal molecule exhibits a refractive index $n_e$ for ordinary light, in which an electric vector of a light wave oscillates perpendicular to a plane on which an optical axis lies, and a refractive index $n_o$ for extraordinary light in which an electric vector oscillates parallel to a plane on which an optic axis lies.

In addition, the liquid crystal molecule has dielectric anisotropy, that is, it has different dielectric constants in directions parallel and perpendicular to a long axis thereof. In the present specification, a dielectric constant in the direction parallel to the long axis of the liquid crystal is defined as a horizontal dielectric constant $\in\|$, and a dielectric constant in the direction perpendicular to the long axis of the liquid crystal is defined as a vertical dielectric constant $\in\perp$. In addition, the difference between the vertical dielectric constant $\in\perp$ and the horizontal dielectric constant $\in\|$ is defined as dielectric anisotropy $\Delta\in$ (i.e., $\Delta\in=\in\|-\in\perp$).

The liquid crystal composition, which makes up the liquid crystal layer 300, is a mixture of liquid crystal materials having various characteristics, and the mixture will be referred to as liquid crystals or a liquid crystal composition throughout the specification.

A kickback voltage $\Delta V_{kb}$ is one of contributing factors to the deterioration of display quality of the LCD. Since the kickback voltage $\Delta V_{kb}$ makes a voltage between the pixel electrode 82 and the common electrode 91 unstable, it should be reduced. The kickback voltage is defined by Equation (1) below.

$$\Delta V_{kb} = \Delta V_g \times C_{gs}/(C_{lc}+C_{gs}), \quad (1)$$

$\Delta V_g$ is the range of fluctuation in a gate voltage $V_g$ when a TFT is turned off, $C_{gs}$ is a parasitic capacitance between the gate electrode 26 of the TFT and the data line 62, and $C_{lc}$ is a liquid crystal capacitance.

Referring to Equation (1), the liquid crystal capacitance $C_{lc}$ must be increased in order to reduce the kickback voltage $\Delta V_{kb}$. That is, the liquid crystal capacitance $C_{lc}$ must be increased in order to reduce the kickback voltage $\Delta V_{kb}$ without additionally implementing a storage capacitor. In order to increase the liquid crystal capacitance $C_{lc}$, the dielectric constant of liquid crystals must be increased.

A ratio $\Delta\in/\in\perp$ of the dielectric anisotropy $\Delta\in$ to the vertical dielectric constant $\in\perp$ of liquid crystals according to the present exemplary embodiment may be 0.5 or less. In addition, rotational viscosity γ1 of the liquid crystals may be 90 to 110 mPa·S. Here, the ratio $\Delta\in/\in\perp$ of the dielectric anisotropy $\Delta\in$ to the vertical dielectric constant $\in\perp$ affects the kickback voltage $\Delta V_{kb}$ generated by the parasitic capacitance $C_{gs}$ of the TFT, which, in turn, affects the display quality of the LCD. Furthermore, the rotational viscosity γ1 affects the response time of the liquid crystals. The ratio $\Delta\in/\in\perp$ of the dielectric anisotropy $\Delta\in$ to the vertical dielectric constant $\in\perp$ has a kind of trade-off relationship with the rotational viscosity γ1. In order to achieve superior display quality and fast response time in the LCD being driven at a high frequency, it is preferable that liquid crystals are formed to satisfy the above conditions. When satisfying the above conditions, the interval at which the data voltage is applied to the pixel electrode 82 becomes small. Accordingly, although the storage wiring is removed, a reduction in the magnitude of the data voltage is small, and occurrence of the kickback voltage $\Delta V_{kb}$ can be reduced even through there is no storage wiring. Besides, when the storage wiring is removed, it is possible to improve an aperture ratio of the LCD.

Further, when the liquid crystal composition further contains approximately 10 to 30 weight % of an alkenyl in the liquid crystals described above, the above characteristics may be achieved more preferably. The liquid crystal panel is formed by arranging elements, such as a polarizer (not shown) and a backlight (not shown) in the above basic structure. In this case, a polarizer may be installed on each of both sides of the basic structure. Specifically, an axis of one polarizer may be disposed parallel to the gate line 22, and the other polarizer may be disposed perpendicular to the gate line 22.

Figure 4:
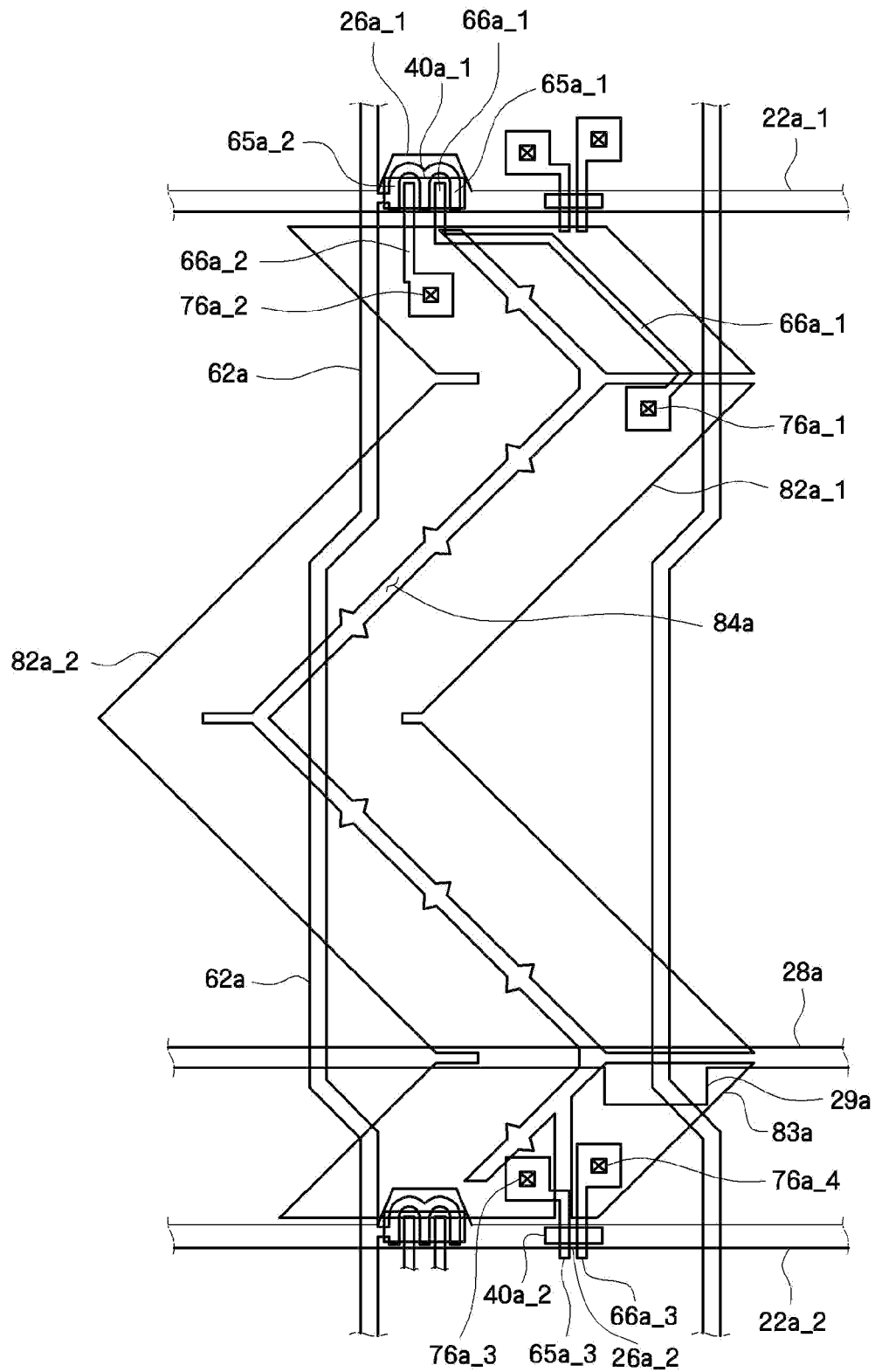
FIG. 4 is a plan view of a lower display panel included in a liquid crystal panel according to another exemplary embodiment of the present invention.
Figure 5:
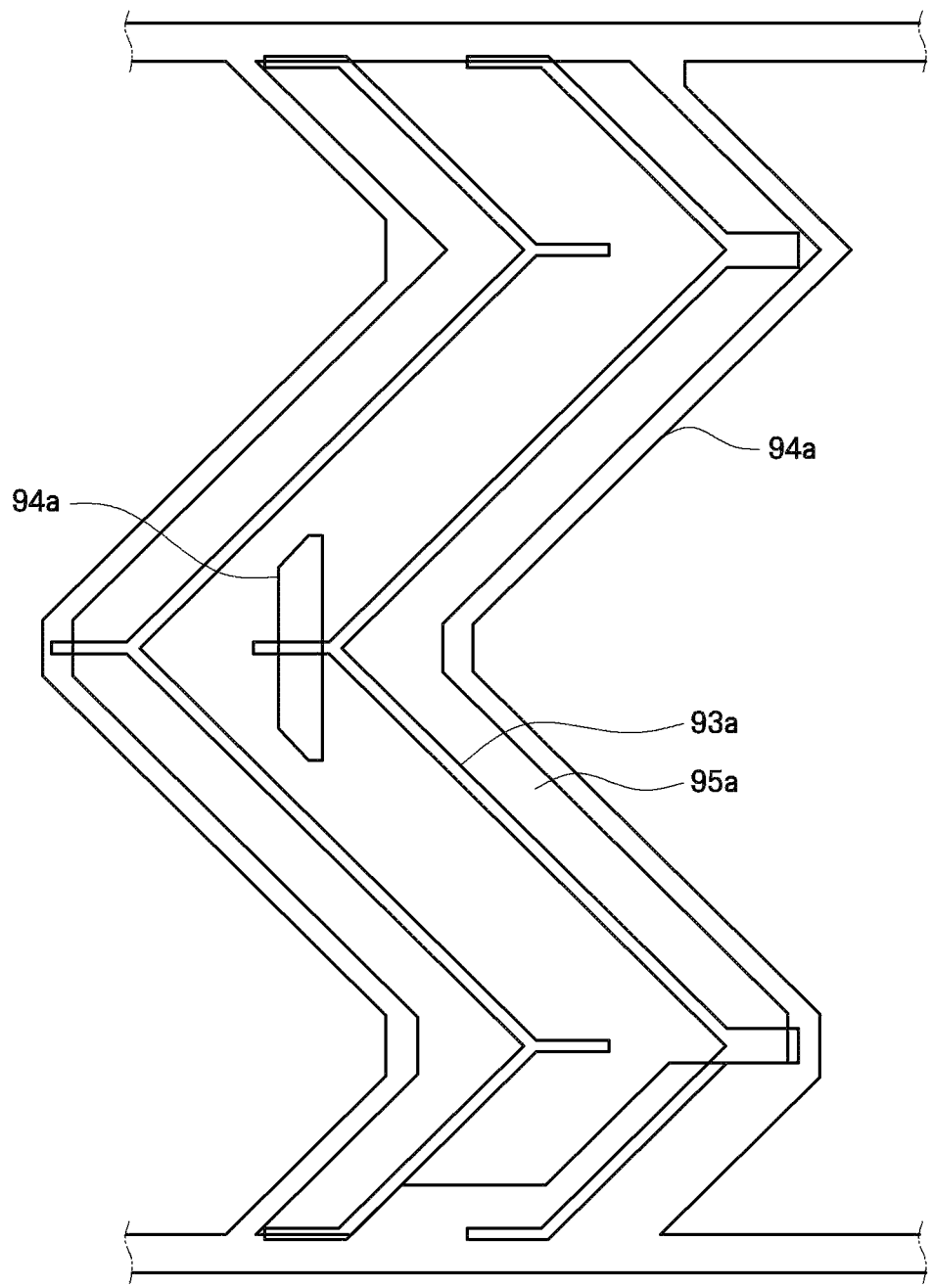
FIG. 5 is a plan view of an upper display panel included in the liquid crystal panel according to another exemplary embodiment of the present invention.
Figure 6:
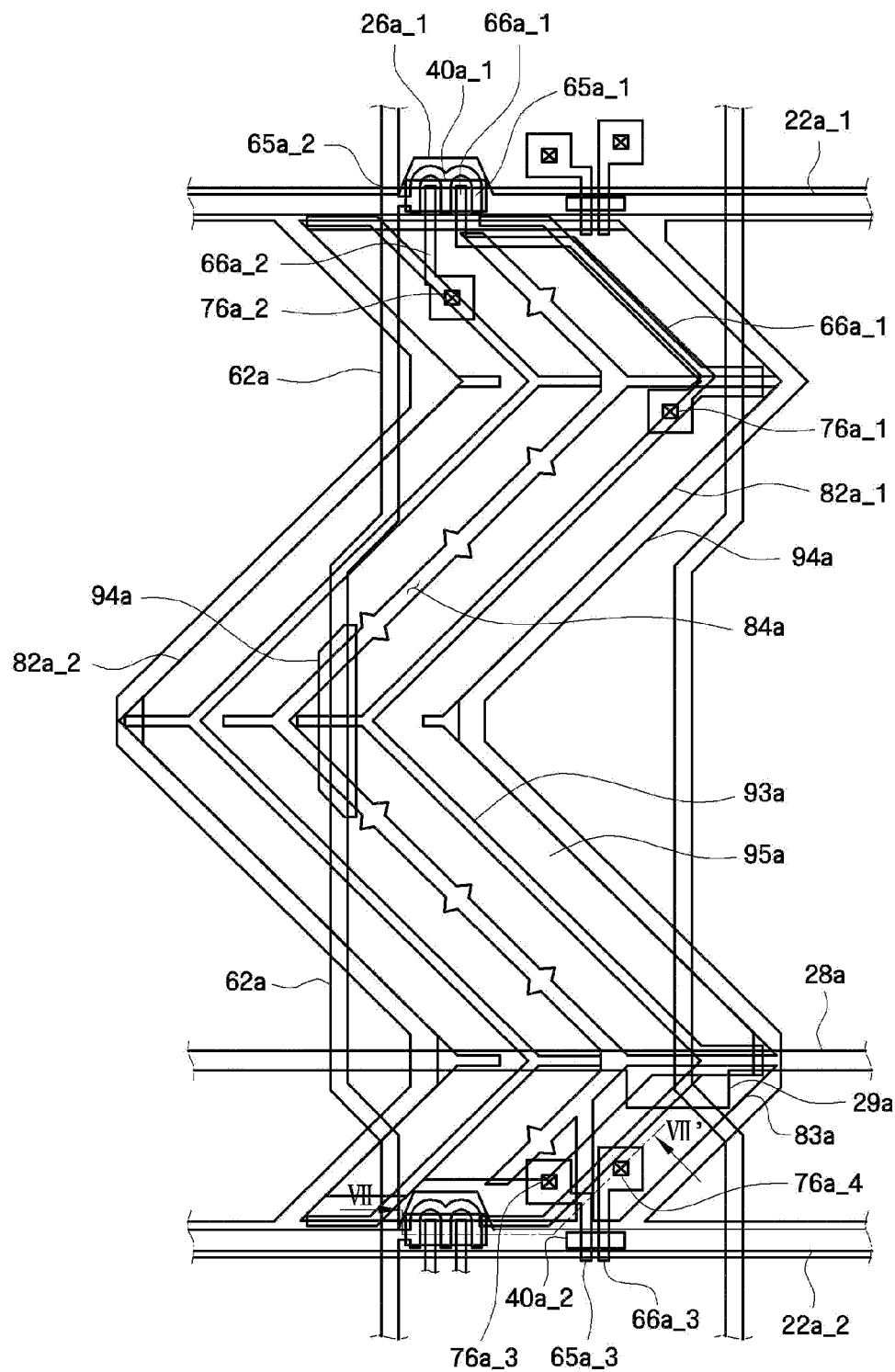
FIG. 6 is a plan view of the liquid crystal panel according to another exemplary embodiment of the present invention.
Figure 8:
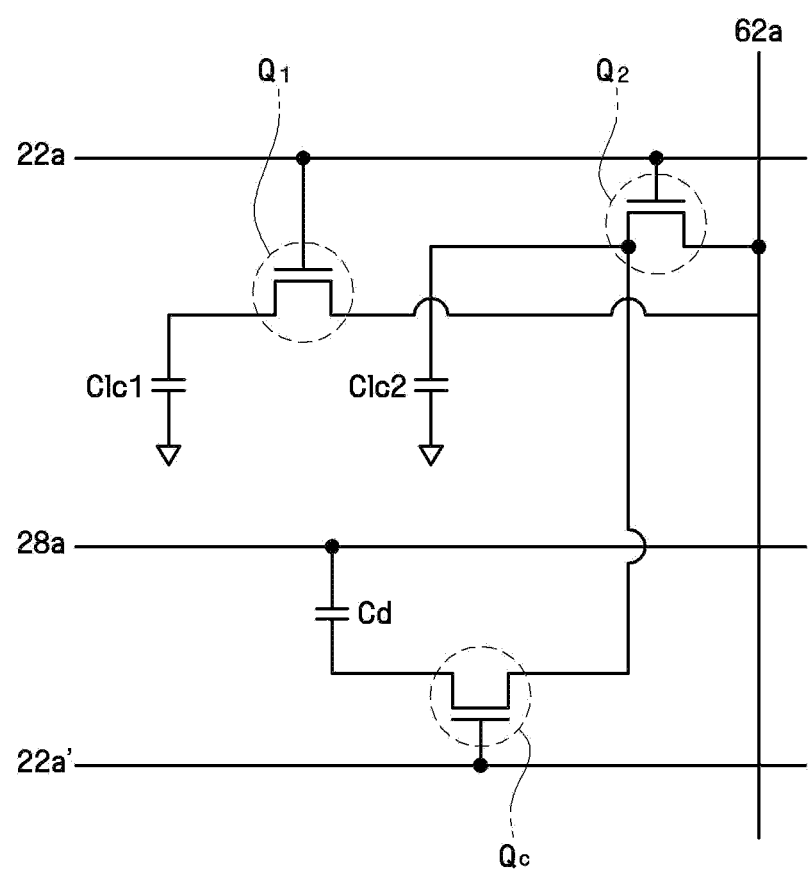
FIG. 8 is an equivalent circuit diagram of a pixel included in the liquid crystal panel of FIG. 6.

Hereinafter, a liquid crystal panel according to another exemplary embodiment of the present invention will be described in detail with reference to FIG. 4, FIG. 5, FIG. 6, and FIG. 8. FIG. 4 is a plan view of a lower display panel 100a included in the liquid crystal panel according to another exemplary embodiment of the present invention. FIG. 5 is a plan view of an upper display panel 200a included in the liquid crystal panel according to another exemplary embodiment of the present invention. FIG. 6 is a plan view of the liquid crystal panel according to another exemplary embodiment of the present invention. FIG. 8 is an equivalent circuit diagram of a pixel included in the liquid crystal panel of FIG. 6.

In the liquid crystal panel according to another exemplary embodiment of the present invention, each pixel includes three TFTs and two pixel electrodes. That is, each pixel includes first, second, and third TFTs $Q_1$, $Q_2$ and Qc, and first and second subpixel electrodes 82a_1 and 82a_2. The first TFT $Q_1$ drives the first subpixel electrode 82a_1, and the second TFT $Q_2$ drives the second subpixel electrode 82a_2. The third TFT Qc is connected to the second subpixel electrode 82a_2 and a first control electrode 83a and changes a voltage applied to the second subpixel electrode 82a_2.

The lower display panel 100a includes a first gate line 22a_1, a second gate line 22a_2, and a data line 62a. The first and second gate lines 22a_1 and 22a_2 horizontally extend parallel to each other on a first insulating substrate. The data line 62a crosses the first and second gate lines 22a_1 and 22a_2. A first gate electrode 26a_1 and a second gate electrode 26a_2 are formed in the first and second gate lines 22a_1 and 22a_2, respectively. A first semiconductor island 40a_1 and a second semiconductor island 40a_2 are formed on first gate electrode 26a_1 and a second gate electrode 26a_2, respectively.

A first source electrode 65a_1, which corresponds to an input terminal of the first TFT $Q_1$, branches off from the data line 62a and is disposed on the first gate electrode 26a_1. A second source electrode 65a_2 corresponds to an input terminal of the second TFT $Q_2$, branches off from the data line 62a, and is disposed on the first gate electrode 26a_1. The first and second source electrodes 65a_1 and 65a_2 are adjacent to each other and are switched on or off by the first gate line 22a_1.

A third source electrode 65a_3, which corresponds to an input terminal of the third TFT Qc, is disposed on the second gate electrode 26a_2 and connected to the second subpixel electrode 82a_2 through a third contact hole 76a_3.

A first drain electrode 66a_1 is connected to the first subpixel electrode 82a_1 through a first contact hole 76a_1, and a second drain electrode 66a_2 is connected to the second subpixel electrode 82a_2 through a second contact hole 76a_2. A third drain electrode 66a_3 is connected to the first control electrode 83a through a fourth contact hole 76a_4.

The first control electrode 83a overlaps a second control electrode 29a to form a control capacitor Cd. The second control electrode 29a branches off from a control line 28a which extends parallel to the first and second gate lines 22a_1 and 22a_2. The first control electrode 83a and the second control electrode 29a may overlap a black matrix 94a. The first control electrode 83a, the first and second subpixel electrodes 82a_1 and 82a_2 may be on the same layer. In addition, the second control electrode 29a, the first and second gate lines 22a_1 and 22a_may be on the same layer.

The first and second subpixel electrodes 82a_1 and 82a_2 may be bent in a zigzag manner. The first and second subpixel electrodes 82a_1 and 82a_2 are spaced from each other by a slit 84a which is a domain partition portion. The domain partition portion is not limited to the slit 82a and may alternatively be a protrusion.

The first and second subpixel electrodes 82a_1 and 82a_2 may be bent at an angle of approximately −45 to +45 degrees with respect to the first and second gate lines 22a_1 and 22a_2.

A liquid crystal layer 300a including liquid crystals is disposed between the upper display panel 200a and the lower display panel 100a. In this case, a ratio $\Delta\in/\in\perp$ of the dielectric anisotropy $\Delta\in$ to the vertical dielectric constant $\in\perp$ of the liquid crystals may be 0.5 or less. In addition, the rotational viscosity γ1 of the liquid crystals may be 90 to 110 mPa·S. In order to obtain these characteristics, the liquid crystals may contain approximately 10 to 30 weight % of an alkenyl.

Figure 7:
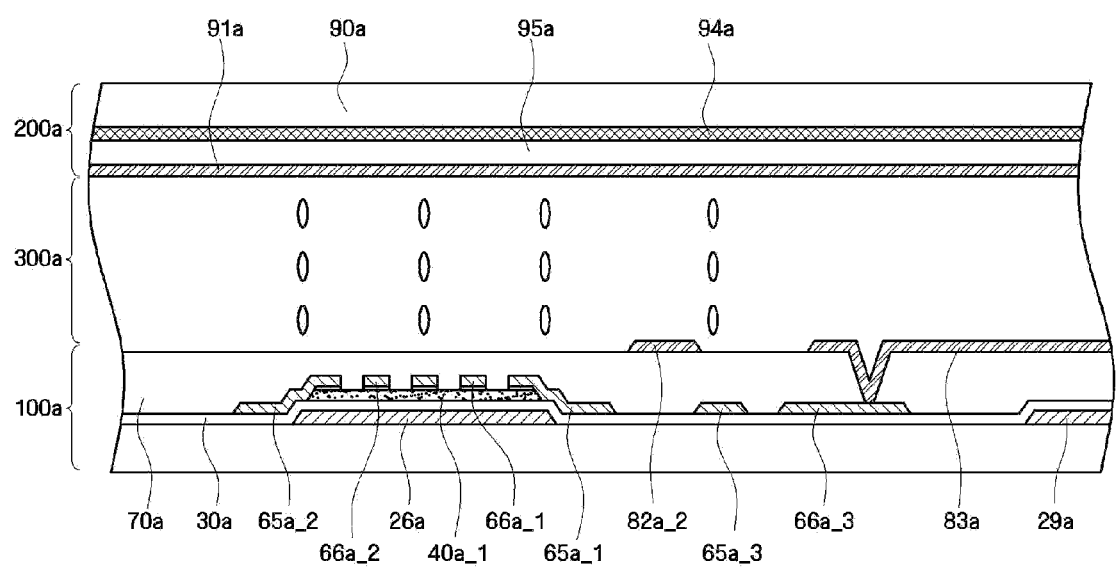
FIG. 7 is a cross-sectional view of the liquid crystal panel of FIG. 6 taken along line VII-VII'.

Referring to FIG. 7 and FIG. 8, the pixel includes first and second gate lines 22a and 22a' and a data line 62a that crosses the first and second gate lines 22a and 22a'. In addition, the pixel includes first, second, and third TFTs Q1, Q2 and Qc. Gate electrodes of the first and second TFTs Q1 and Q2 are connected to the first gate line 22a, and a gate electrode of the third TFT Qc is connected to the second gate line 22a'. The second gate line 22a' may be an independent line or a line that is connected to gate electrodes of first and second TFTs (not shown) of an adjacent pixel.

While input terminals of the first and second TFTs $Q_1$ and $Q_2$ are connected to the data line 62a, an input terminal of the third TFT Qc is connected to an output terminal of the second TFT $Q_2$. Output terminals of the first and second TFTs $Q_1$ and $Q_2$ are connected to the first and second subpixel electrodes 82a_1 and 82a_2, respectively, in order to apply specified voltages to the liquid crystal layer 300a. That is, the first TFT $Q_1$ is connected to the first subpixel electrode 82a_1 to form a first liquid crystal capacitor Clc1, and the second TFT $Q_2$ is connected to the second subpixel electrode 82a_2 to form a second liquid crystal capacitor Clc2. A common electrode 91a faces the first and second subpixel electrodes 82a_1 and 82a_2, and a common voltage Vcom is applied to the common electrode 91a.

The input terminal of the third TFT Qc is connected to the second subpixel electrode 82a_2 which is the output terminal of the second TFT $Q_2$. An output terminal of the third TFT Qc is connected to the first control electrode 83a and forms a control capacitor Cd together with the second control electrode 29a.

The control capacitor Cd uses the control line 28a as one of its electrodes, and a fixed voltage is applied to the control line 28a. In this case, the fixed voltage may be the common voltage Vcom.

When the first and second TFTs $Q_1$ and $Q_2$ are turned on, the first liquid crystal capacitor Clc1 is formed between the first subpixel electrode 82a_1 and the common electrode 91a, and the second liquid crystal capacitor Clc2 is formed between the second subpixel electrode 82a_2 and the common electrode 91a. When the third TFT Qc is turned on, the control capacitor Cd changes the difference of voltage applied to the second liquid crystal capacitor Clc2, which results in the difference between the voltages charged in the first and second liquid crystal capacitors Clc1 and Clc2.

Figure 9:
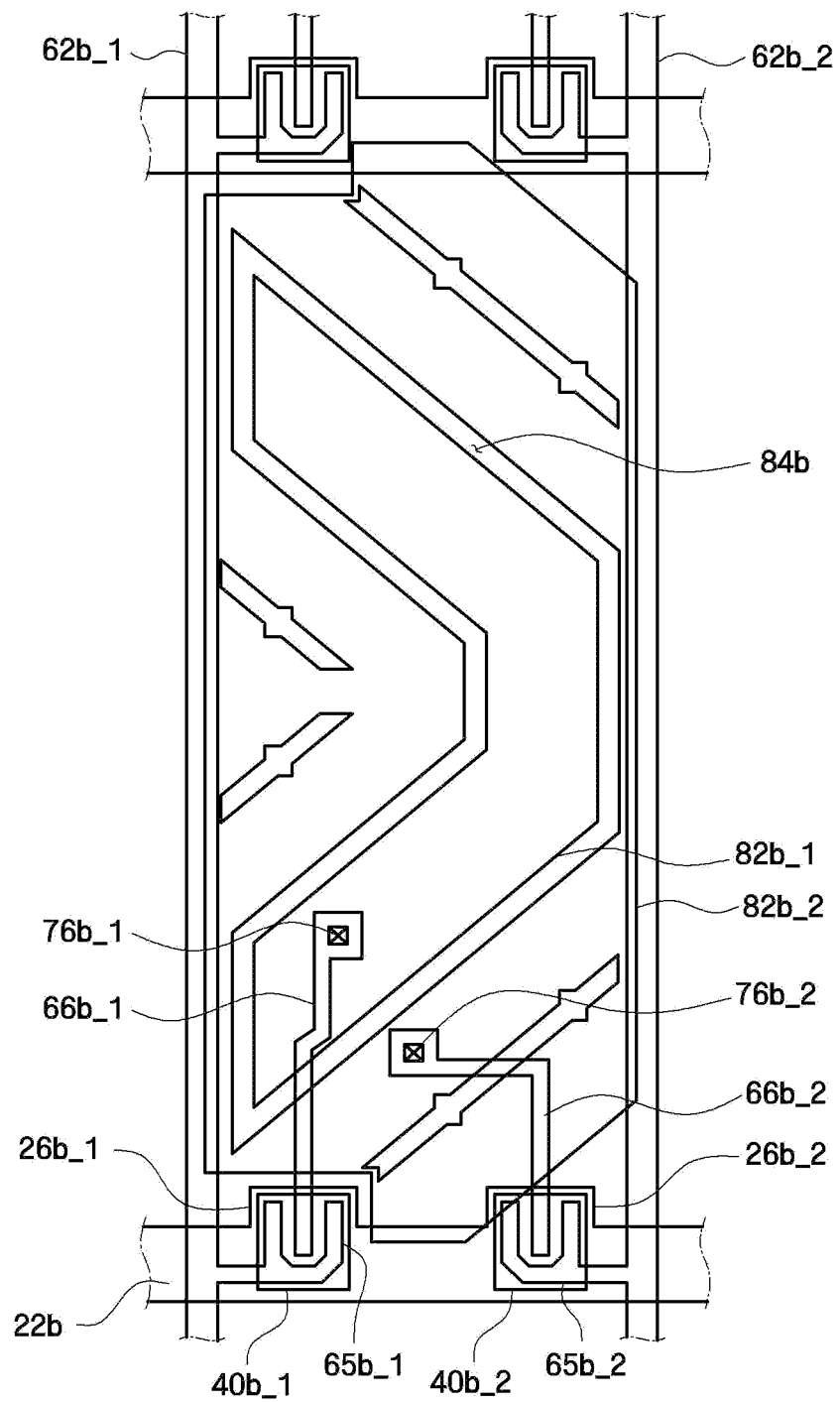
FIG. 9 is a plan view of a lower display panel included in a liquid crystal panel according to still another exemplary embodiment of the present invention.

Hereinafter, a liquid crystal panel according to still another exemplary embodiment of the present invention will be described in detail with reference to FIG. 9. FIG. 9 is a plan view of a lower display panel included in the liquid crystal panel according to still another exemplary embodiment of the present invention.

Referring to FIG. 9, first and second data lines 62b_1 and 62b_2 cross gate wiring. The first data line 62b_1 delivers a first data voltage to a first subpixel electrode 82b_1, and the second data line 62b_2 delivers a second data voltage to a second subpixel electrode 82b_2.

The first subpixel electrode 82b_1 is connected to a gate line 22b and the first data line 62b_1 by a switching element to receive a gate signal and the first data voltage. The switching element connected to the first subpixel electrode 82b_1 may be a TFT including gate electrode 26b_1, source electrode 65b_1, drain electrode 66b_1, and semiconductor layer 40b_1. The drain electrode 66b_1 is connected to the first subpixel electrode 82b_1 via contact hole 76b_1. The second subpixel electrode 82b_2 is connected to the gate line 22b and the second data line 62b_2 by a second switching element to receive the gate signal and the second data voltage. The switching element connected to the second subpixel electrode 82b_2 may be a TFT including gate electrode 26b_2, source electrode 65b_2, drain electrode 66b_2, and semiconductor layer 40b_2. The drain electrode 66b_2 is connected to the second subpixel electrode 82b_2 via contact hole 76b_2. In this case, the first data voltage may be relatively higher than a common voltage, and the second data voltage may be relatively lower than the common voltage.

A relatively high data voltage is applied to the first subpixel electrode 82b_1, and a relatively low data voltage is applied to the second subpixel electrode 82b_2.

At a low grayscale level, liquid crystals arranged on the second subpixel electrode 82b_2, to which a relatively low data voltage is applied, are aligned such that their directors are perpendicular to the lower display panel. Thus, light emitted from a backlight (not shown) cannot pass through the second subpixel electrode 82b_2.

In this regard, if the second subpixel electrode 82b_2 overlaps the first and second data lines 62a and 62b, it may block light, which is generated around the first and second data lines 62b_1 and 62b_2, at a low grayscale level, which may prevent leakage of the light.

The first subpixel electrode 82b_1 may be shaped like English character 'V' which is rotated 90 degrees in a counterclockwise direction or may be surrounded by the second subpixel electrode 82b_2. The first and second subpixel electrodes 82b_1 and 82b_2 are separated from each other by a slit 84b, and the slit 84b may be at an angle of approximately −45 to +45 degrees with respect to the gate line 22b.

An upper display panel (not shown) is installed to face the lower display panel described above, and a liquid crystal layer containing liquid crystals is disposed between the upper and low display panels to complete the liquid crystal panel. In this case, a ratio $\Delta\in/\in\perp$ of the dielectric anisotropy $\Delta\in$ to the vertical dielectric constant $\in\perp$ of the liquid crystals maybe 0.5 or less. In addition, rotational viscosity γ1 of the liquid crystals may be 90 to 110 mPa·S.

The liquid crystal panel described above is capable of not only maintaining superior display quality without requiring a storage wiring, but also may also allow an increase in aperture ratio as a result of removal of the storage wiring. In addition, if the driving frequency of the LCD is a high frequency, even though the storage wiring is not formed, the interval at which the data voltage is applied to the first and second subpixel electrodes 82b_1 and 82b_2 becomes small, and a reduction in the magnitude of the data voltage is small. Besides, when the storage wiring is removed, it is possible to increase the aperture ratio of the LCD.

Figure 10:
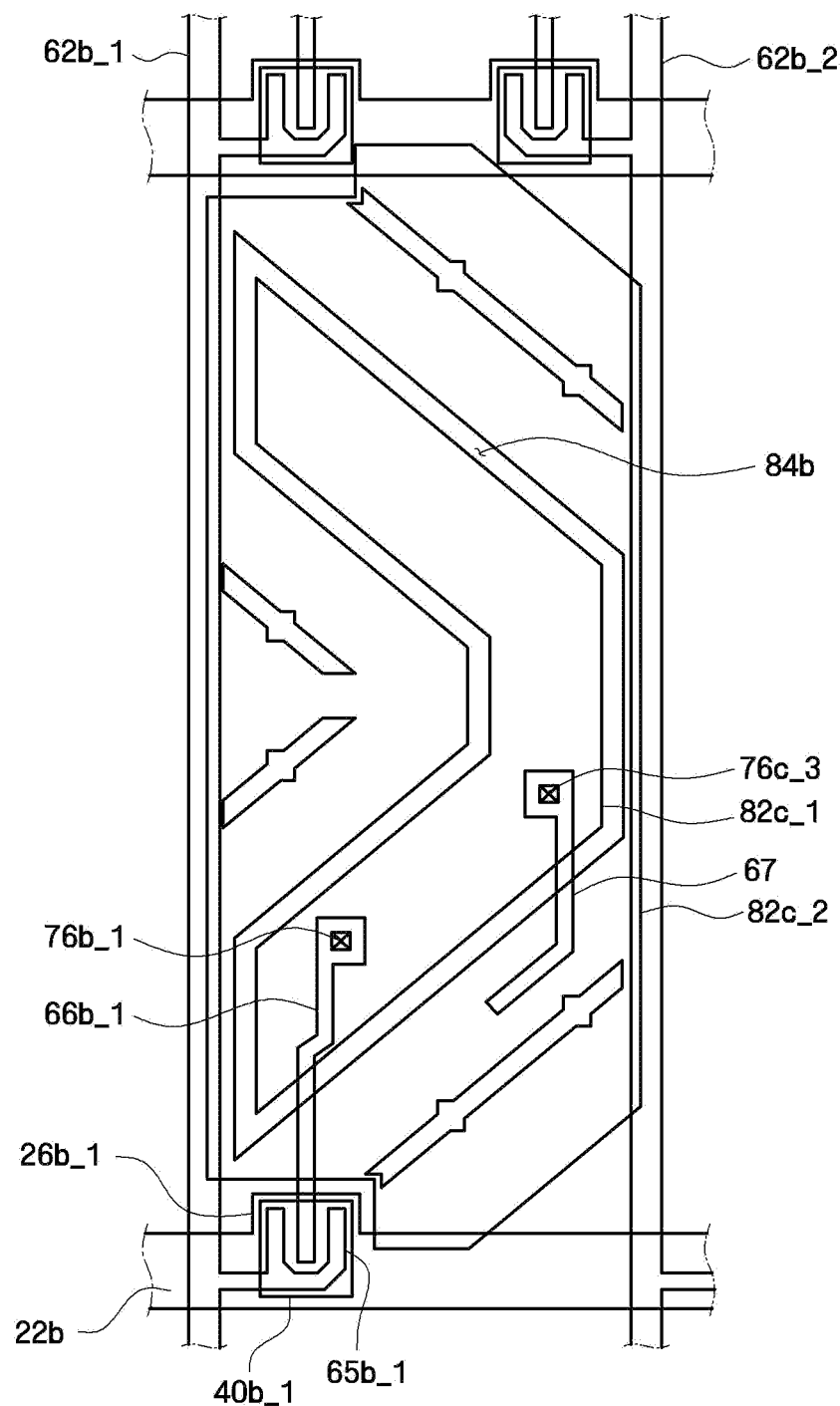
FIG. 10 is a plan view of a lower display panel included in a liquid crystal panel according to still another exemplary embodiment of the present invention.

Hereinafter, a liquid crystal panel according to still another embodiment of the present invention will be described in detail with reference to FIG. 10. FIG. 10 is a plan view of a lower display panel included in the liquid crystal panel according to still another exemplary embodiment of the present invention.

Referring to FIG. 10, the liquid crystal panel according to still another exemplary embodiment of the present invention includes first and second subpixel electrodes 82c_1 and 82c_2 and a coupling electrode 67.

The first and second subpixel electrodes 82c_1 and 82c_2 are spaced apart from each other by a slit 84b, which is a domain partition portion, and are insulated from each other. In addition, the first and second subpixel electrodes 82c_1 and 82c_2 engage with each other to form a pixel region. The first subpixel electrode 82c_1 is connected to a TFT and receives a data voltage directly from the TFT. A lower data voltage is applied to the second subpixel electrode 82c_2 than to the first subpixel electrode 82c_1 by a 'coupling capacitor' which is composed of the first subpixel electrode 82c_1 and the coupling electrode 67.

Each pixel electrode may be cut obliquely at an angle of approximately −45 to +45 degrees with respect to a gate line 22b and thus partitioned into the first and second subpixel electrodes 82c_1 and 82c_2. Therefore, liquid crystals within each pixel may tilt in four directions, thereby securing visibility in the four directions. This arrangement of the first and second subpixel electrodes 82c_1 and 82c_2 is a mere exemplary embodiment of the present invention. That is, each pixel electrode may be partitioned in various ways. When necessary, each pixel electrode may be partitioned into three or more subpixel electrodes.

The first and second subpixel electrodes 82c_1 and 82c_2 are coupled to each other and operate accordingly. That is, the coupling electrode 67, which is connected to the first subpixel electrode 82c_1 via contact hole 76c_3, and the second subpixel electrode 82c_2 are insulated from each other by a dielectric interposed therebetween and overlap each other to form a 'coupling capacitor.' For this reason, if a data voltage is applied to the first subpixel electrode 82c_1, a voltage lower than the data voltage applied to the first subpixel electrode 82c_1 is applied to the second subpixel electrode 82c_2.

The coupling electrode 67 does not have to be connected to the first subpixel electrode 82c_1. The coupling electrode 67 may alternatively be connected to the second subpixel electrode 82c_2. That is, if a coupling electrode, which is connected to a second subpixel electrode, and a first subpixel electrode overlap each other and thus form a 'coupling capacitor,' when a data voltage is applied to the second subpixel electrode, a lower voltage may be applied to the first subpixel electrode.

The LCD structured as described above includes a liquid crystal layer whose ratio $\Delta\in/\in\perp$ of the dielectric anisotropy $\Delta\in$ to the vertical dielectric constant $\in\perp$ may be 0.5 or less and whose rotational viscosity γ1 may be 90 to 110 mPa·S. Thus, the LCD can maintain superior display quality in a stable manner without requiring a storage wiring. In addition, if the driving frequency of the LCD is a high frequency, even though the storage wiring is not formed, the interval at which the data voltage is applied to the first to third subpixel electrodes 82c_1, 82c_2 and 82c_3 becomes small, and a reduction in the magnitude of the data voltage is small. Besides, when the storage wiring is removed, it is possible to increase an aperture ratio of the LCD.

Figure 11:
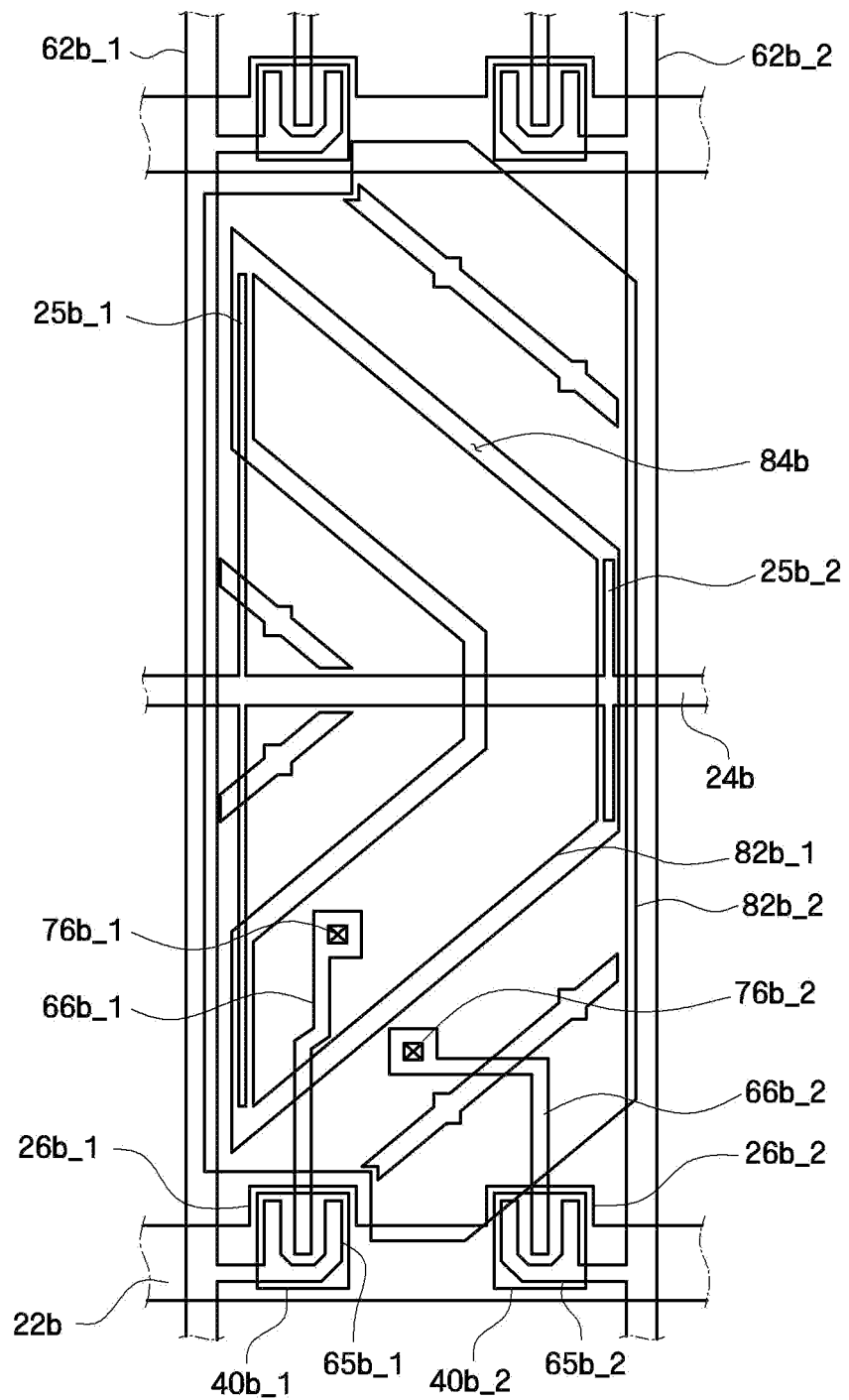
FIG. 11 is a plan view of a lower display panel included in a liquid crystal panel according to still another exemplary embodiment of the present invention.

Hereinafter, a liquid crystal panel according to still another exemplary embodiment of the present invention will be described in detail with reference to FIG. 11. FIG. 11 is a plan view of a lower display panel included in the liquid crystal panel according to still another exemplary embodiment of the present invention.

Referring to FIG. 11, a decoupling line 24b crosses first and second subpixel electrodes 82b_1 and 82b_2 and extends substantially parallel to a gate line 22b. The decoupling line 24b delivers a decoupling voltage to a first decoupling electrode 25b_1 and a second decoupling electrode 25b_2. The decoupling line 24b may be used to repair defective pixel electrodes. For example, if the first subpixel electrode 82b_1 is defective, the first subpixel electrode 82b_1 and the decoupling line 24b may be made to short-circuit by laser welding. Then, a corresponding pixel may become an 'off' pixel.

The decoupling line 24b may be on the same layer as the gate wiring and may have a width of 5 to 15 μm. Decoupling capacitance may be 5 to 20% of liquid capacitance. That is, the capacitance of a capacitor, which is formed by the overlapping of the decoupling line 24b with the first subpixel electrode 82b_1 or the second subpixel electrode 82b_2, may be reduced to such an extent that the capacitor substantially cannot function as a storage capacitor. The capacitance of the decoupling line 24b may be sufficient to allow it to function as wiring that applies a voltage to the first and second decoupling electrodes 25b_1 and 25b_2. The capacitance of the decoupling line 24b may be 10% or less of the liquid capacitance.

First and second data lines 62b_1 and 62b_2 cross the gate wiring. The first data line 62b_1 delivers a first data voltage to the first subpixel electrode 82b_1, and the second data line 62b_2 delivers a second data voltage to the second subpixel electrode 82b_2.

The first subpixel electrode 82b_1 is connected to the gate line 22b and the first data line 62b_1 by a switching element to receive a gate signal and the first data voltage. The second subpixel electrode 82b_2 is connected to the gate line 22b and the second data line 62b_2 by a switching element to receive the gate signal and the second data voltage. In this case, the first data voltage may be relatively higher than a common voltage, and the second data voltage may be relatively lower than the common voltage.

A relatively high data voltage is applied to the first subpixel electrode 82b_1, and a relatively low data voltage is applied to the second subpixel electrode 82b_2. At a low grayscale level, liquid crystals arranged on the second subpixel electrode 82b_2, to which a relatively low data voltage is applied, are aligned such that their directors are perpendicular to the lower display panel. Thus, light emitted from a backlight (not shown) cannot pass through the second subpixel electrode 82b_2.

In this regard, if the second subpixel electrode 82b_2 overlaps the first and second data lines 62b_1 and 62b_2, it blocks light, which is generated around the first and second data lines 62b_1 and 62b_2, at a low grayscale level, which may prevent leakage of the light.

The first and second decoupling electrodes 25b_1 and 25b_2 are connected to the decoupling line 24b to receive a decoupling voltage from the decoupling line 24b. The first and second decoupling electrodes 25b_1 and 25b_2 prevent the first subpixel electrode 82b_1 from being coupled to the first and second data lines 62b_1 and 62b_2, respectively. The first and second decoupling electrodes 25b_1 and 25b_2 are arranged parallel to the first and second data lines 62b_1 and 62b_2 and extend between the first subpixel electrode 82b_1 and the first and second data lines 62b_1 and 62b_2, respectively.

The first and second decoupling electrodes 25b_1 and 25b_2 prevent leakage of light between the first and second subpixel electrodes 82b_1 and 82b_2 and the first and second data lines 62b_1 and 62b_2. When necessary, the first and second decoupling electrodes 25b_1 and 25b_2 may partially overlap the first subpixel electrode 82b_1, the second subpixel electrode 82b_2, the first data line 62b_1 or the second data line 62b_2. The first and second decoupling electrodes 25b_1 and 25b_2 may reduce the difference between the coupling capacitance of the first subpixel electrode 82b_1 and the first data line 62b_1 and that of the first subpixel electrode 82b_1 and the second data line 62b_2.

Figure 12:
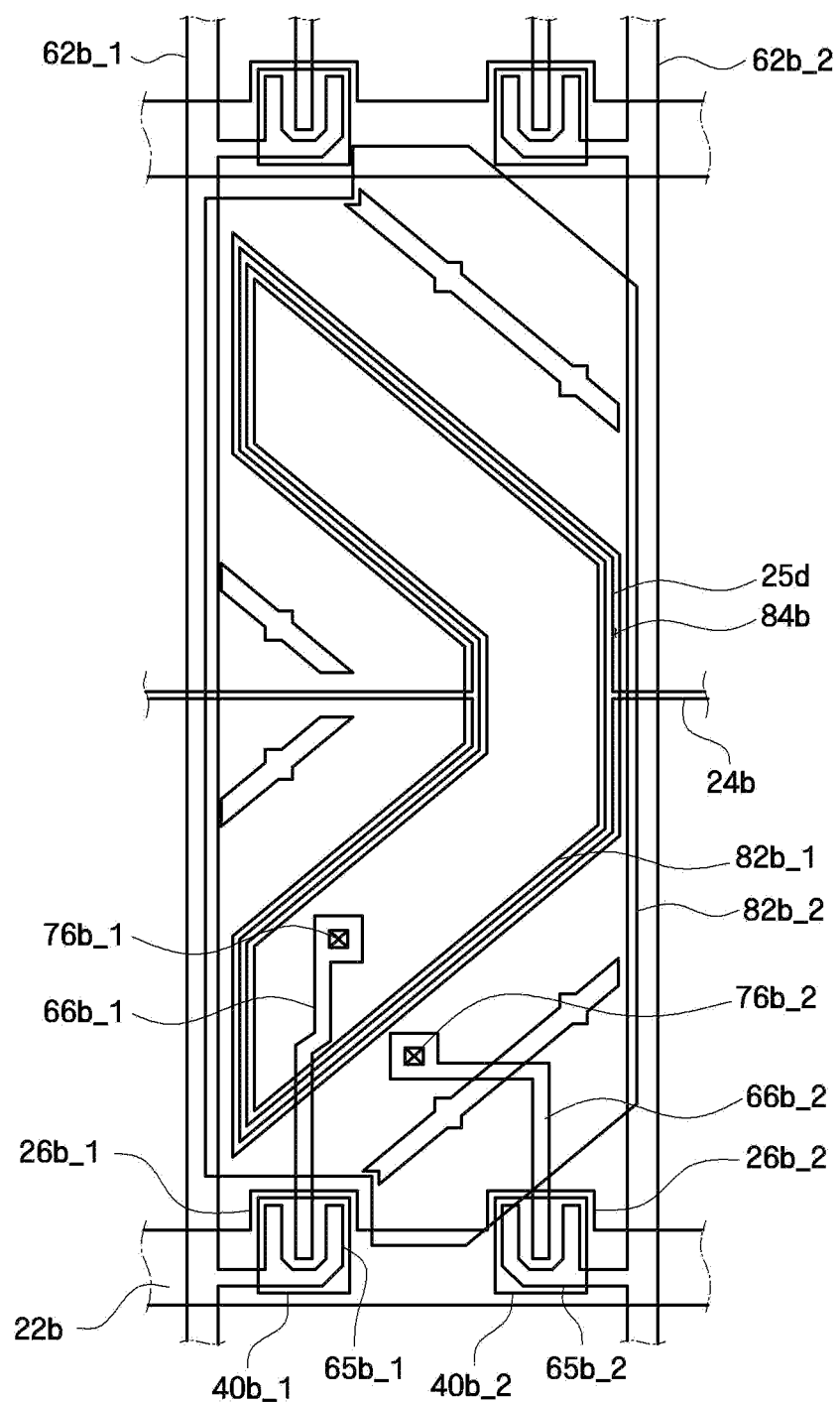
FIG. 12 is a plan view of a lower display panel included in a liquid crystal panel according to still another exemplary embodiment of the present invention.

Hereinafter, a liquid crystal panel according to still another exemplary embodiment of the present invention will be described in detail with reference to FIG. 12. FIG. 12 is a plan view of a lower display panel included in the liquid crystal panel according to still another exemplary embodiment of the present invention. The liquid crystal panel according to still another exemplary embodiment of the present invention includes a decoupling electrode 25d which overlaps a slit 84b between first and second subpixel electrodes 82b_1 and 82b_2. The first subpixel electrode 82b_1 is surrounded by the second subpixel electrode 82b_2 and spaced apart from the second subpixel electrode 82b_2 by the slit 84b. The slit 84b may be at an angle of approximately −45 to +45 degrees with respect to a gate line 22b. The decoupling electrode 25d is connected to a decoupling electrode of an adjacent pixel by a decoupling line 24b.

In order to increase the overall pixel aperture ratio, the decoupling line 25d may extend parallel to the gate line 22b and across the center of the second subpixel electrode 82b_2. In addition, the decoupling line 25d may not overlap the first subpixel electrode 82b_1. That is, the decoupling line 25d may be shaped like a hollow trapezoid or English character 'V', which lies laterally and has an empty space therein, and may be disposed parallel to the first subpixel electrode 82b_1.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) comprising:
a liquid crystal panel; and
a gate driver configured to apply a gate signal having a driving frequency equal to or greater than 100 Hz to the liquid crystal panel,
wherein:
the liquid crystal panel comprises:
a first display panel;
a second display panel facing the first display panel;
a liquid crystal composition disposed between the first display panel and the second display panel and includes liquid crystals;
a first gate line and a second gate line disposed on the first display panel;
a data line that crosses the first gate line and the second gate line;
a control line extending parallel to the first and second gate lines and disposed between the first and second gate lines;
a first subpixel electrode disposed on the first display panel and connected to the first gate line by a first switching element;
a second subpixel electrode disposed on the first display panel, spaced apart from the first subpixel electrode, and connected to the first gate line by a second switching element;
a control switching element that is switched on or off in response to a gate signal transmitted from the second gate line and is connected to the second subpixel electrode;
a first control electrode that is connected to the control switching element, the first control electrode being disposed in the same layer as the first and second subpixel electrodes, the first control electrode being separated from the first and second subpixel electrodes; and
a second control electrode which overlaps the first control electrode to form a control capacitor configured to receive a control voltage, the second control electrode branching off from the control line and being disposed in the same layer as the first and second gate lines;
if a dielectric constant in a direction parallel to a long axis of liquid crystals is defined as a horizontal dielectric constant $\in\|$, a dielectric constant in a direction perpendicular to the long axis of the liquid crystals is defined as a vertical dielectric constant $\in\perp$, and the difference between the vertical dielectric constant $\in\perp$ and the horizontal dielectric constant $\in\|$ is defined as dielectric anisotropy $\Delta\in$, then a ratio $\Delta\in/\in\perp$ of the dielectric anisotropy $\Delta\in$ to the vertical dielectric constant $\in\perp$ of the liquid crystal composition is 0.5 or less; and
the first subpixel electrode and the second subpixel electrode are bent in a zigzag manner.

2. The LCD of claim 1, wherein the driving frequency is a multiple of 60 Hz.

3. The LCD of claim 1, wherein a rotational viscosity of the liquid crystal composition is 90 to 100 mPa·S.

4. The LCD of claim 1, wherein the liquid crystal composition includes 10 to 30 weight % of an alkenyl.

5. The LCD of claim 1, wherein the first control electrode is made of indium tin oxide (ITO) or indium zinc oxide (IZO).

6. The LCD of claim 1, wherein the control voltage is a common voltage.

7. The LCD of claim 1, wherein the liquid crystal panel further comprises a black matrix disposed on the first display panel or the second display panel and overlapping the first control electrode and the second control electrode.

8. The LCD of claim 1, wherein the second gate line is a gate line of an adjacent pixel.

9. The LCD of claim 1, further comprising a slit arranged between the first subpixel electrode and the second subpixel electrode, the slit being at an angle of −45 to +45 degrees with respect to the gate line.

* * * * *